United States Patent [19]

Fogle, Jr. et al.

[11] 4,142,757
[45] Mar. 6, 1979

[54] FOLD DOWN MULTI-PURPOSE VEHICLE SEAT BACK CORE OR THE LIKE AUTOMOTIVE STRUCTURAL MEMBER

[75] Inventors: Alva E. Fogle, Jr., Buffalo Grove, Ill.; William E. Brennan, Troy; Jacque Passino, Orchard Lake, both of Mich.

[73] Assignee: K & M Plastics, Inc., Elk Grove Village, Ill.

[21] Appl. No.: 845,845

[22] Filed: Oct. 27, 1977

[51] Int. Cl.² ............................................. A47C 7/00
[52] U.S. Cl. ............................ 296/63; 297/DIG. 2
[58] Field of Search ............................ 296/63, 66, 69; 297/DIG. 2, 452

[56] References Cited

U.S. PATENT DOCUMENTS

| 3,317,238 | 5/1967 | Smoll | 296/69 |
| 3,334,941 | 8/1967 | Krasinski | 296/66 |
| 3,669,496 | 6/1972 | Chisholm | 297/DIG. 2 |

Primary Examiner—Philip Goodman
Attorney, Agent, or Firm—Silverman, Cass & Singer, Ltd.

[57] ABSTRACT

An automotive structural member which is especially intended for use as a fold down multipurpose vehicle seat back core but is not limited to such use.

19 Claims, 8 Drawing Figures

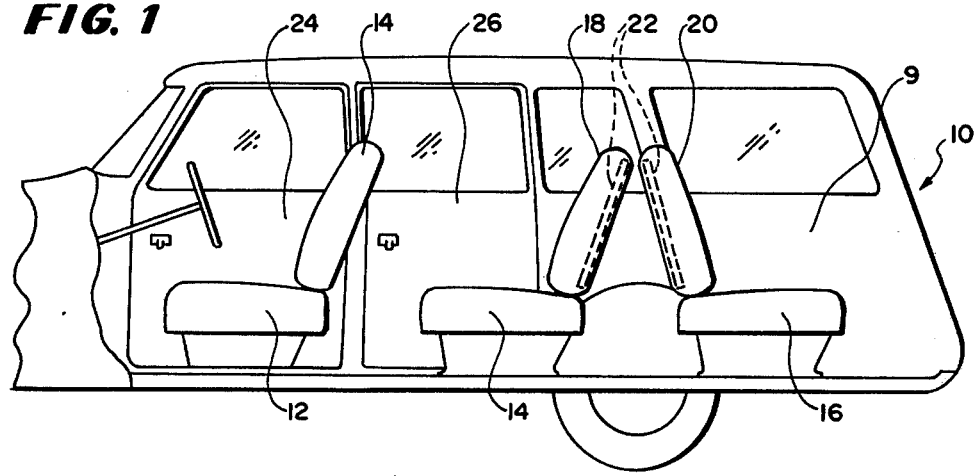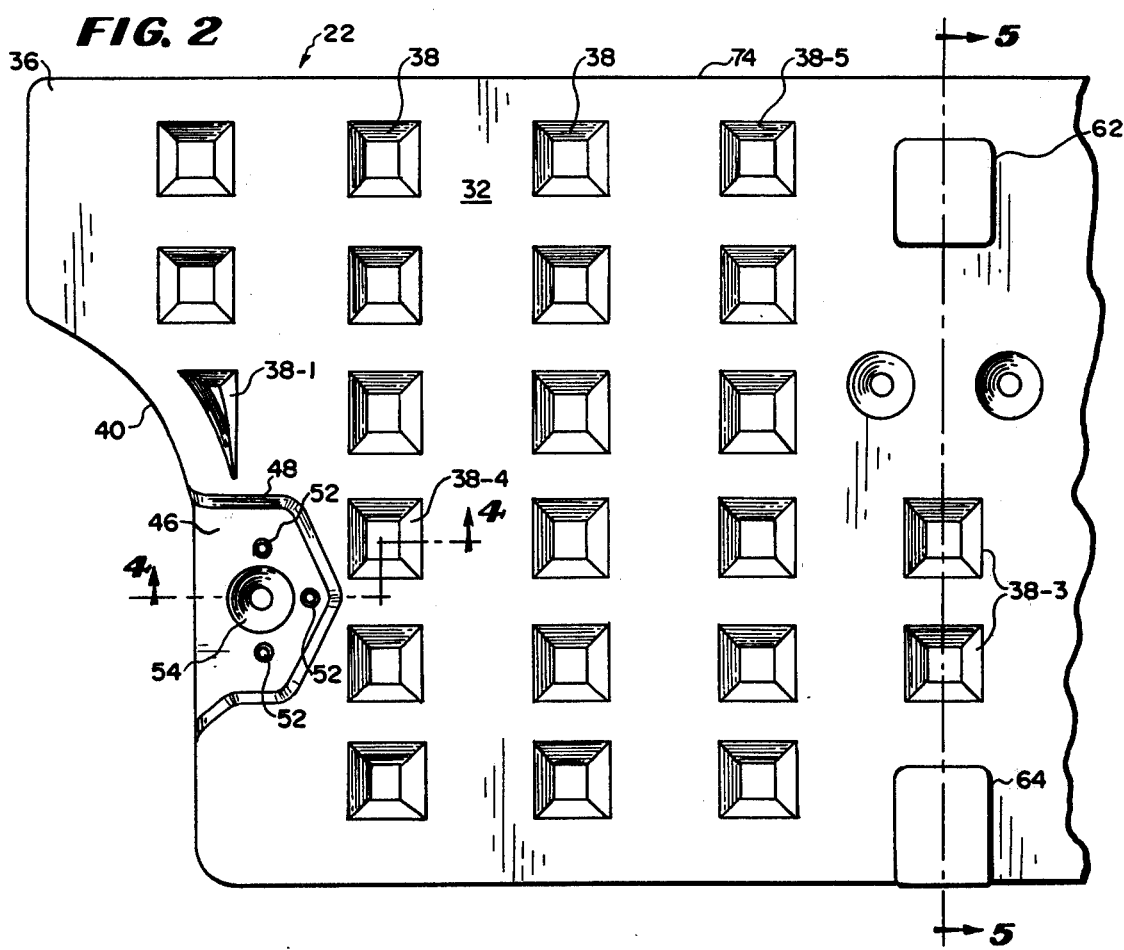

FOLD DOWN MULTI-PURPOSE VEHICLE SEAT BACK CORE OR THE LIKE AUTOMOTIVE STRUCTURAL MEMBER

The structural member is a hollow generally planar article formed out of plastic such as any of the synthetic resins which are available at the present time as polymers and can be blow-molded. The member is blow-molded in a type of mold which provides indented parts in one or both walls that are of such depth as to engage and weld with the inner surface of the opposite wall or walls of the member or with similar indented parts which are formed in the opposite wall or walls. The member has the indented parts generally distributed about the area of the member thereby forming transverse tying links or beams between the opposite walls thus giving the member great strength.

The tying links can be provided specifically at any location of the member which is to be subjected to greater stress than the other sections of the member. They can be provided in suitable size and configuration at places where hinges, connectors, brackets or plates are to be secured, such as for example in the vicinity of metal sockets or nuts molded in place as inserts and adapted to receive fastener means in order to effect the securement of such hinges, connectors, brackets or plates.

FIELD AND BACKGROUND OF THE INVENTION

The field of the invention generally comprises automotive structural members and while particularly the specification herein describes what can be referred to in the automotive art as a load floor the invention is not intended to be limited thereto.

"Load floor" as known in the trade is an appellation generally applied to a core or bracing plate that is inserted into or connected with the back of a bench seat in a station wagon and intended to be folded down during use of the station wagon to carry goods. This core or bracing plate is required to accomplish several purposes. It must furnish strength for the seat back to the end that it is safe in the event of shocks and accidents and will not yield, bend or collapse. It must provide the connections to enable the seat back to be mounted in erect or angled position while the seat is being used by passengers; it must provide the needed hinge means to enable the folding of the seat back between the two positions in which it is intended to be used; it must provide anchoring means for various brackets which may be required to connect the seat back in its floor position, either alone or with other members. The core or bracing plate must be strong enough to support any kind of load which can be accommodated in the vehicle without yielding or collapsing.

Other requirements of such an article are of importance in that they complicate the fabrication and construction of the load floor. These requirements are that the load floor be light in weight, economical to manufacture so that the vehicle builder can incorporate the same into a vehicle of low selling price and that it is durable.

Until the advent of this invention load floors have been constructed of steel. It is believed that some work has been done in aluminum as well in order to attempt to lighten the load floor. In any event, metal load floors have been used universally, so far as is known.

The core or bracing plate of a seat back is a complicated article to manufacture from metal. As a result all such load floors known have been fabricated of many parts and pieces, using welding and fastening techniques. Strength is achieved by means of ribs, either pressed into the metal plate or welded onto the same. Attachment of hinges, connectors, brackets and the like complicate and increase the cost of manufacture. The need for tools, dies and fixtures for fabrication increases the capital expenditure for making these metal load floors, and where different models of vehicles call for differences in the design and construction the expenditure accelerates.

Despite the modern methods of manufacture, high speed production and the benefits of mass production, load floors in use today are heavy, expensive, and have a tendency to distort through use. When subjected to great weight over a period of time in use as a floor or considerable pressure through hard use as a seat back metal cores will bend and retain the distortion. This, of course, is undesirable.

In accordance with the invention, the load floor is formed as a blow-molded member out of polyethylene or other of the synthetic polymers that are used in blow-molding. It emerges from the mold as a completely finished article but for the need to attach the hinges, brackets and connectors. Inserts may be placed in the mold before each charge carrying nuts or other sockets which are permanently molded into the finished article and will thus receive fastening means when installation occurs.

In the case of the fabricated metal load floors, the article is a unit made out of multiple pieces and is not very pleasant in appearance. It is thus normally buried in the upholstery of the seat back, those parts which of necessity must protrude being carpeted, painted or otherwise finished. In the case of a load floor constructed in accordance with the invention, the surface of the article can be molded with any desired texture built into the mold, such as for example — graining. Further, the plastic used can be of any desired color without difficulty. Thus, it is feasible to construct the seat back so that the floor load is exposed. This provides a hard surface for the floor when used to support goods.

It has been known to form structural members for vehicles from molded synthetic resins. Such members have been formed of fiberglass reenforced epoxy resins, either molded in forms and cured therein or applied in multiple laminas. Such members as may be subject to stress must be fabricated in situ by known techniques or constructed in much the same manner as metal members, usually manually. Production methods call for the construction of large molds into which the layers of fiberglass and the resin are alternately laid after which the article must be subjected to a cure.

Notwithstanding such techniques, it is believed that there are no members of fiberglass reenforced epoxy resins, or even of the resins themselves which are completely enclosed and hollow. This type of molding is even more expensive than metal fabrication and not as strong and durable.

Structural members for vehicles which are at the present time made of metal and which are ideally suited for the techniques of the invention are vehicle doors which must support glass panes and mechanisms for raising and lowering the same; side panels which serve as doors or vents without glass and which must be operated; any parts which are required to be strong and durable and which carry equipment and accessories.

Blow-molding as referred to herein is a technique which has been developed in relatively recent times. According to the practice which has developed a charge of plastic such as polymer which is readily converted into a plastic taffy-like consistency is extruded from a so-called head in a tubular form depending vertically from the head. This form is called a parison and the extruded amount of plastic is adjusted to equal that used in the finished article with allowance for flash and similar slight waste. The bottom end of the parison is open but may be closed by pinching before molding if needed because of the shape to result to enable some inflation before the dies close.

After the parison has been discharged completely, but while still depending from the head the opposite sections of a vertically split two-part mold are tightly brought together with the parison captured between them. The mold completely encloses the parison but for a passageway for air. This passageway may be provided by a nozzle depending from the head, it may be provided in a nozzle that is mounted to be surrounded by the closing mold at the bottom of the blow-molding machine, it may be provided by a side nozzle carried by the mold or it may be a small opening in the mold through which a fine needle or the like has been inserted after the mold parts are brought together. Air may be admitted while the parison is formed or slightly after its formation and before the mold parts are brought together in order to shape the parison more geometrically to meet the general shape into which it will eventually be formed precisely. This would be the case where the final shape is a radical change from the cylindrical form of the parison and requires the bottom end of the parison to be pinched together to enable pre-expansion.

After the mold closes, admission of air into the tubular length expands the plastic resin into the mold, the extruding process having been discontinued when the mold closed. After the plastic has set, the mold is opened, the air pressure being discontinued at any convenient time, and the finished product is removed. There is usually flash of a small amount around the parting line of the mold and this is readily trimmed off, either by means of a band saw or manually, depending upon the nature of the article. The plastic is still hot enough to enable this to be done easily and quickly.

Thereafter the process is repeated.

Obviously there is no need for layering any materials in the mold, no curing, no handling of dangerous and volatile materials, no fabricating and no requirement for metal working tools and dies. One mold does everything.

While blow-molding techniques, per se, have been known and it has even been known to blow-mold chair seats, it has not been considered feasible by those in the automotive field to whom this invention is directed to achieve by blow-molding a structural member with the strength, light weight and economy achieved by the invention.

As will be explained hereinafter, one of the features of the invention is the use of tying links which are produced by the molded article to produce connecting beams between the parallel walls, the inner surface of one wall where the indentation occurs being welded to the inner surface of the other wall at the same location. This provides unusual strength and enables the article to flex and absorb shock. The distribution of these links throughout the area of the article and especially close to places where the article will be subject to stress provides a unitary structure that can withstand great stress. It has been known in blow-molding to provide indentations of a general type described herein for ornamentation and in the course of making such indentations some may have been deep enough to touch the other wall of the article being blow-molded, but so far as known, there has not been such an article where the indentations are distributed generally throughout the article to give the article strength and to rigidify the same. Indeed it is believed that the touching of indentations in the past, if such occurred, was fortuitous and not intended to be of a nature as to positively engage and weld together. Further so far as known, the technique which has been described and comprising the formation of identations of any kind in blow-molded articles, has not been practiced in the making of structural members that are to receive the stresses and loadings to which automotive structural members are subjected.

Finally, so far as known, and in addition to that which is explained above, indented blow-molded members have not been used as automotive structural members which are required to carry and be strong enough to support and operate with automotive hardware.

SUMMARY OF THE INVENTION

An automotive structural member such as for example, a fold down multi-purpose vehicle seat back core or the like is formed by blow-molding. The member comprises a completely enclosed hollow article of integral construction which has a large planar area and a relatively small dimension in thickness. Means are provided for the securement of hinges and the like to the member.

The member is formed with parallel walls connected around their edges by an integral peripheral wall. Tying links connect between the parallel walls, being distributed throughout the area of the member generally, these links being formed by indented parts in one parallel wall extending to the inner surface of the other parallel wall and engaged and welded thereto during the blow-molding process, or formed on both parallel walls and meeting in a welded and engaged connection between the parallel walls.

Socket inserts for fastener connection may be provided which are integrally molded in place during the blow-molding process and there may be tying links in the vicinity of these inserts to provide added strength at the resulting stress areas.

The member may be installed within seat backs to serve as support and may additionally or instead provide a support member for receiving a floor load. It may be used as vehicle panels, doors and the like.

BRIEF DESCRIPTION OF THE DRAWINGS

FIG. 1 is a relatively simple diagrammatic view showing the layout of seats in a station wagon vehicle in order to illustrate the location of a seat back core intended to serve as a load floor additionally;

FIG. 2 is a front elevational view of a fragment of a seat back core constructed in accordance with the invention;

DESCRIPTION OF THE PREFERRED EMBODIMENTS

Figure 3:
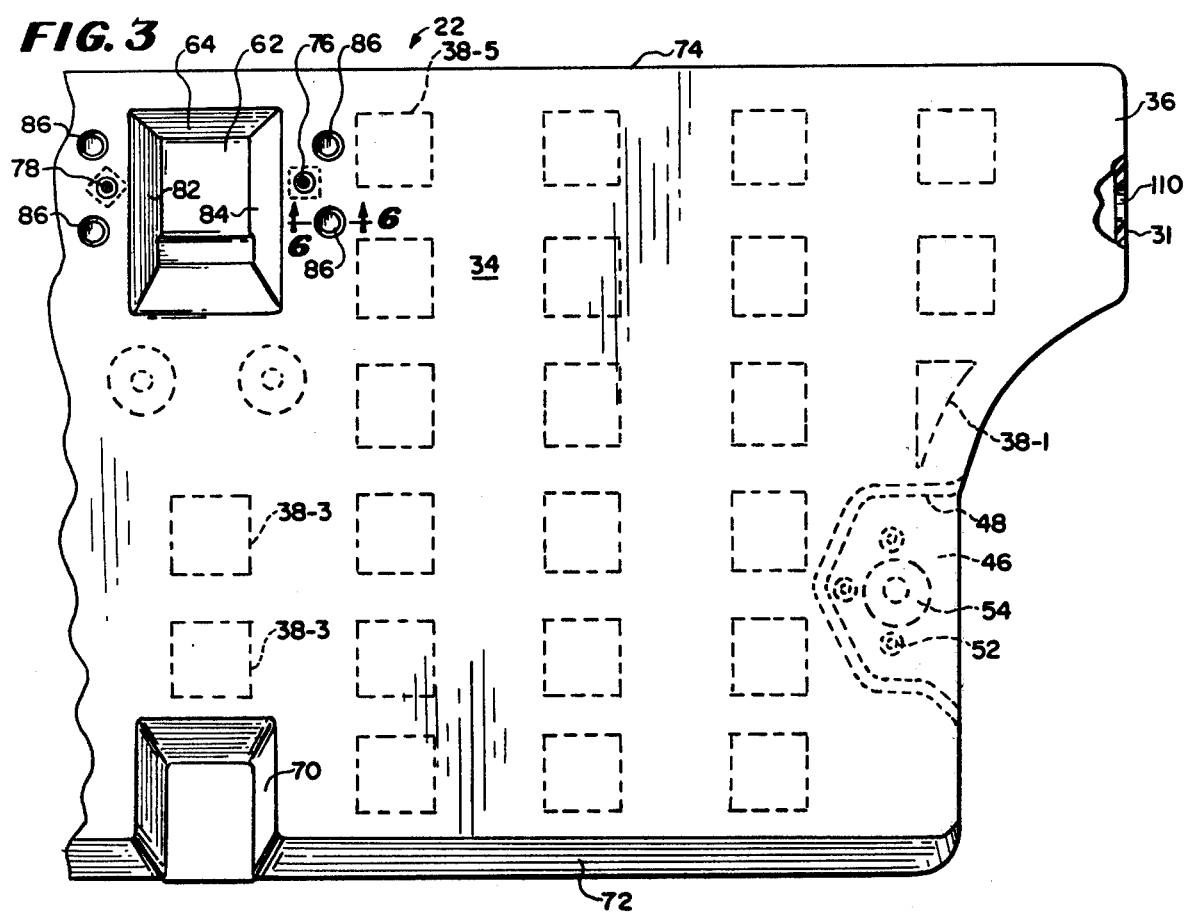
FIG. 3 is a rear elevational view of the same.

As stated previously the invention is concerned with the construction of a structural member for automotive vehicles by blow-molding techniques and through the use of means which provides unusual strength and other advantages.

According to the invention, the strength is achieved by the use of tying links which are automatically formed in the member during its molding process and by distributing these links generally about the member. This use of such tying links combined with the box sections resulting which are achieved by the blow-molding technique produce the unusual advantages. The product is rigid enough to support all of the weight that can be supported by metal load floors and more; it flexes and absorbs shock without setting; it cannot rattle or lose its integrity as in the case of metal load floors because there is nothing to get loose, the member being an integral article; it cannot injure passengers because it can be made without sharp edges; it can be exposed because it can be molded with a surface texture and finish not requiring further processing; it is light in weight; it is economical.

In FIG. 1 there is illustrated a layout in the compartment 9 of a so-called station wagon 10 which is relatively large in this instance, but could have two seats instead of the three shown. The front or driver's seat 12 has a seat back 14 which is usually hinged for some movement but not intended to be laid flat. It could have a core but this is not necessary. The passenger seats 14 and 16 are provided with seat backs 18 and 20 respectively which are intended to be laid flat when it is desired to use the station wagon 10 for carrying goods. Various constructions provide for one or both of the seat backs 18 and 20 to be laid flat and include various types of connectors, brackets, hinges and the like connected to the bottom of the compartment 9, the side walls, etc. None of these is shown since there are so many variations. The mechanisms may provide for sliding of the seats 14 and/or 16 to achieve the desired load-carrying capacity and compartment configuration.

The rear faces of the seat backs 18 and 20 will normally be uppermost in the compartment 9 when the seats are arranged to be laid flat and it is required that the interior of the seat backs be provided with a rugged core that can serve as a floor. The cores are shown at 22 in phantom lines in FIG. 1, these being concealed within the seat back and covered with some kind of material such as carpeting or metal or could be exposed in which case they would be finished in a color and texture to match the decor of the vehicle.

The invention is concerned with the construction of these cores 22 as an example, and vehicle structural members generally. For example, the doors 24 and 26 might advantageously be made in accordance with the invention.

Looking now at FIG. 2 there is illustrated the left half of a load floor 22 constructed in accordance with the invention, the right half being identical. The view is called an elevational view in the drawings because while the thickness of the load floor 22 is about an inch (2½ centimeters) for the example to be detailed, the vertical dimension is about 21 inches (54 centimeters) and the horizontal dimension is about 49 inches (1¼ meters) the normal orientation of the load floor 22 is vertical. At least it is close to vertical, being usually canted. When in use as a floor it will be laid flat and the surface seen in FIG. 2 will be the bottom while the surface seen in FIG. 3 will be the upper one.

The load floor 22 is formed of a fully enclosed (but for a small blow hole) hollow plastic article which is integrally formed by blow-molding techniques. There is a front wall 28 which will normally be hidden by the upholstery of a seat cushion of the seat back such as 18 or 20, a parallel rear wall 30 which will have the load engaged thereon. The front surface is designated 32 and the rear surface is designated 34. In the particular model shown there are wings 36 at the upper corners of the load floor 22. A peripheral wall 31 connects the parallel walls 30 and 32 completely around their edges.

The load floor 22 has a series of indentations 38 which are formed in the front wall 28 and hence are discontinuances in the plane of the front surface 32. As seen in FIG. 2 these indentations 38 are relatively evenly spaced frusto-pyramidal indentations that are distributed over the entire surface 32. There are twenty complete indentations 38 on the left side, an irregular shaped indentation 38-1 at the curve 40 below the wing 36, two complete indentations 38-3 in the center and there will also be a repeat of the twenty complete indentations and the irregular shaped 38-1 on the right side.

Figure 4:
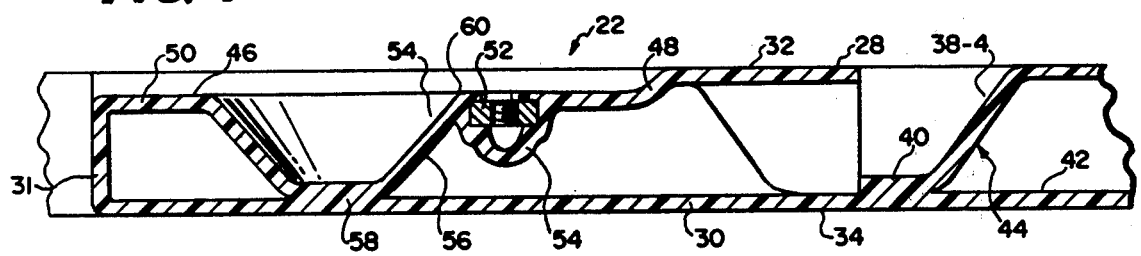
FIG. 4 is a fragmentary sectional view taken generally along the line 4—4 of FIG. 2 and in the indicated direction on a much larger scale.

The indentations 38 are formed by providing suitable protrusions of frusto-pyramidal shape in one of the mold parts which close around the extruded parison tube described above. The dimensions of the protrusions are chosen so that the height is sufficient to bring the bottom end 40 (FIG. 4) thereof into engagement with the inner surface 42 of the wall 30 while the resin is hot and plastic. As a result there is a welding of the said bottom 40 to the wall 30 and a thickened connection is formed.

When cooling takes place, the resulting formation 44 comprises a rigid tying link or beam extending between the parallel walls 28 and 30. This means that there will be forty two such tying links of frusto-pyramidal configuration and two irregular shaped links formed by the indentations 38-1 between the parallel walls 28 and 30. This results in a light weight, hollow, extremely strong structure that can carry considerable weight. Furthermore, it will flex to some extent which means that it can readily resist shocks; nevertheless the flexure will not result in any permanent set being effected in the load floor 22.

Samples of load floors constructed as described and of the dimensions indicated have passed all safety standards tests and weight tests of the automobile manufacturers to which the same have been subjected with results as favorable as and in some instances more favorable than those of metal load floors of the same general dimensions intended for the same models of vehicles.

The thickness of the sections 40 are about 5 millimeters comprising an approximately doubling of the normal wall thickness. This is achieved in a blow-molding process where the normal technique calls for the wall thicknesses to be substantially uniform all over the article being formed.

The securement of hinges, brackets, connectors and the like is a relatively simple matter with the load floor construction of the invention. The plates to be secured can be set into depressed or decreased thickness areas by the ready expedient of building the depression into the mold. This is done without sacrificing the strength of the member.

Thus, a fastening member in the form of a plate, comprising half of a hinge or the like, may be expected to be secured on opposite lateral ends of the load floor 22. A securing area is formed at 46 which is spaced below and parallel to the surface 32, being joined to the surface by the angled joint 48 surrounding the securing area 46 and blending by relatively smooth curves, if desired. The joint 48 is nothing more than a continuation of the wall 28 and of the same thickness as is the upper wall 50 of the securing area 46.

The plate or other member to be attached may be suitably perforated for screws or threaded bolts (none of which is shown) and these screwed into nuts 52 that are molded in place as inserts in the wall 50. The mold forming the load floor 22 will have suitable structures for forming the anchors 54 for the nut inserts 52. A simple technique of effecting this can comprise providing pins in the mold with the nuts engaged on the pins. After the mold is opened the load floor 22 is pulled off the pins with the nuts permanently secured. Any other method can be used such as for example that disclosed in U.S. Pat. No. 3,742,995.

The portion of the load floor 22 where the plates or hinges are to be fastened at the areas 46 may be located such that it is impractical to provide the strengthening effect of the depressions which are designated 38. It will be noted that the reason for the depressions 38 being pyramidal is that the cross section of the tying links 44 formed thereby in a plane parallel to the walls 28 and 30 at the thickened bottom end 40 is square. This provides the maximum area of connection for any given geometric configuration whose maximum dimension is one side of the square. The result is a strong box section beam.

In the case of the area 46 in the immediate vicinity of the three nut inserts 52 shown, the frusto-conical depression 54 in the wall produces a tying link 56 and a thickened bottom 58 which substantially strengthens the load floor 22 at this critical location. The configuration of the tying link 56 is such that it can be brought very close to all three of the circularly disposed inserts 52. The dimensions of a practical device can be proportionally determined from those given above and applied to FIG. 4 to note that the diameter of the upper entrance 60 of the depression or indentation 54 is slightly more than 4 centimeters.

Figure 5:
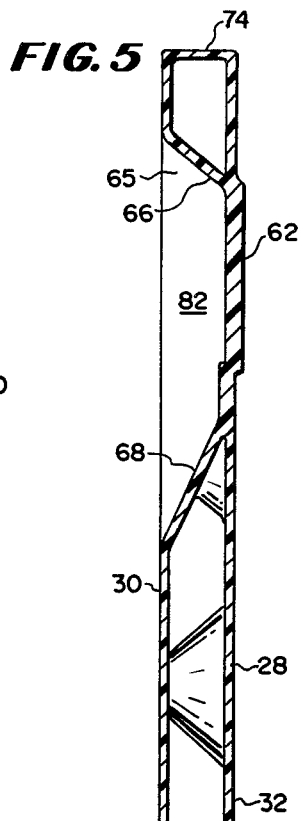
FIG. 5 is a vertical sectional view taken generally along the line 5—5 of FIG. 2 and in the indicated direction on a somewhat larger scale.

In FIG. 2, there are two plaques seen at 62 and 64 these being the thickened rectangular plates integrally formed during the blow-molding process normally to strengthen the load floor 22 at locations where latches or brackets are to be secured on the opposite face of the member 22. Thus, the plaque 62 is congruent with the bottom of the rectangular depression 64 and actually comprises the bottom floor of that depression. A bracket or latch plate or other hardware is intended to fit in the depression 65, well below the surface 34. The depression forms side walls 66 and 68 which are tapered and connect with the wall 30 as best seen in FIG. 5.

The same arrangement is provided at the bottom of the load floor 22 where the plaque 64 is located. It comprises the thickened bottom wall produced by the depression 70 that is formed in the front wall 30. Note that the particular design provides for the bottom of the entire load floor 22 to be tapered as at 72 which is no problem at all in the blow-molding process since it merely means a modification of the mold from what it would be if the bottom edge were relatively squared off as the top edge 74.

Figure 6:
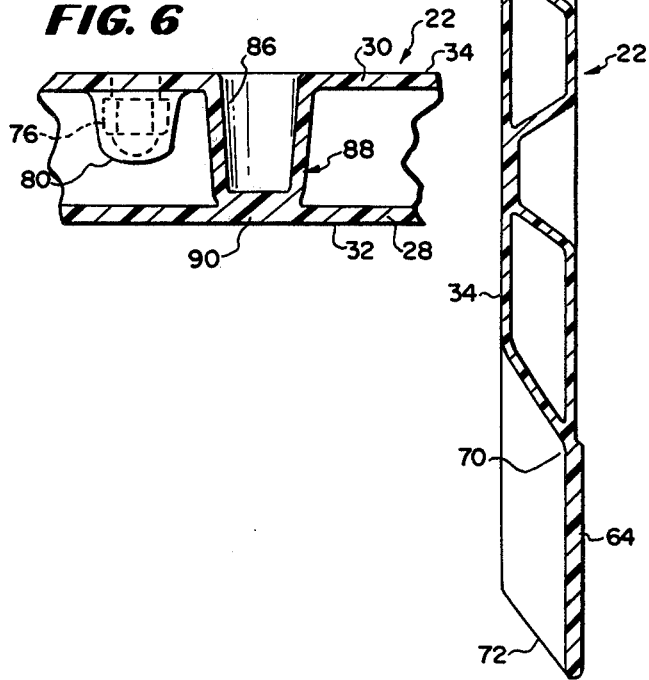
FIG. 6 is a fragmentary sectional view taken generally along the line 6—6 of FIG. 3 and in the indicated direction.

In the case of the depression 64, the hardware article that is to be accommodated is intended to be secured to the load floor 22 by means of screws or bolts that are to be threaded into the nut inserts 76 and 78 that are molded into anchor formations such as 80 (FIG. 6) which are similar to the formations 54. The inserts 76 and 78 are disposed on opposite sides of the depression 64 alongside of the side walls thereof, somewhat spaced from the nearest frusto-pyramidal formation 38-5 and its tying link. While it is true that the side walls such as 66, 68 and those not seen in section in the views but provided at 82 and 84 seen in elevation are connected between the parallel walls 28 and 30 in the same manner as the tying links such as 44, for additional strength, smaller tying links may be provided immediately adjacent to the inserts 76 and 78. Thus, relatively small diameter cylindrical indentations 86 are provided as shown in FIGS. 3 and 6 producing small tying links 88 having thickened floors 90 where they are welded to the wall 28 during the blow-molding process. The depressions 86 are shown as slightly frusto-conical since they are preferably tapered to provide the necessary draft for easy mold separation.

There are no inserts illustrated adjacent the depression 70 since it may be presumed that this formation is to clear some hardware that is otherwise secured external of the load floor 22. Certain forms of the invention could have the required inserts and strengthening tying links.

The invention can be embodied in load floors of a great variety of configurations and having many different types of hardware secured. Likewise tail gates, doors, panels carrying accessories and equipment and the like can be constructed in accordance with the invention. The blow-molding process applied in the manner disclosed provides unexpected strength to such members.

It is clear also that the tying links need not be formed fully in one of the walls and not in the other. In the case of a load floor such as described it is convenient to have as few indentations and impressions as feasible in that surface which faces up for obvious reasons. In a member where this is not of great consequence, or even in areas of a load floor where it is not important, the tying links can be formed partially in each of the walls of the hollow member during the blow-molding process.

Figure 7:
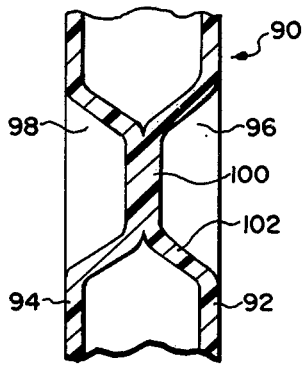
FIG. 7 is a fragmentary sectional view taken generally through a modified form of the invention to show a tying link of a type different from that shown in FIG. 6.

In FIG. 7 there is shown in section a fragment of a structural member 90 which has a front wall 92 and a rear wall 94 each of which is provided with an indentation such as 96 and 98, respectively, of substantially the same geometric configuration and alignment. Each indentation 96 and 98 extends halfway into the member 90 and the dimensions are chosen so that during the blow-molding process the bottoms touch and weld together to form the double thickened web 100. The resulting tying link 102 is of different formation than a link such as 44 or 88 or 56 but serves the identical function — to provide a beam or transverse structural member strengthening the resulting article. The sectional configuration could be square, circular, etc.

Figure 8:
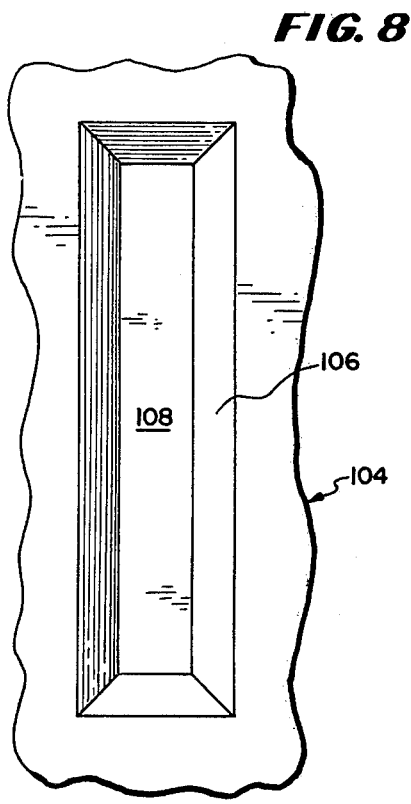
FIG. 8 is a fragmentary elevational view of a modified form of the invention to show a variation in the kind of indentation used.

In FIG. 8 there is illustrated a plan view of a fragment of a structural member 104 in which the depression 106 is rectangular instead of square in section thus demonstrating a modified form of the invention. The depression could be of any geometric configuration which is convenient or economical to make so long as there is a touching of the bottom such as 108 with the interior surface of the opposite wall to weld together.

A typical blow-hole as required in blow-molding is shown at 110 in FIG. 3.

The specific resins preferred in blow-molding structural members intended to take rather heavy punishment are high density polyethylene and polypropylene but these are not to be considered as limiting the invention.

In the specification and claims the walls 28 and 30 have been described as parallel. These walls need not be geometrically parallel but could be at a slight angle relative to one another to provide a tapered load floor or the like. Likewise the walls could have different or the same curvatures. Reference to "parallel" is for convenience and not intended as limiting.

It is seen that considerable variation can be effected in size, shape, configuration and arrangement of the load floors, in the sizes, types and locations of the tying links and in the various means to secure and mount the hardware. These variations are readily capable of being made without departing from the spirit or scope of the invention as defined in the appended claims.

What it is desired to secure by Letters Patent of the United States is:

1. A load floor for the core of a fold down vehicle seat or the like automotive structural member comprising
   A. a hollow blow-molded member of synthetic resin whose overall thickness is substantially less than its size,
   B. including a pair of generally parallel walls extending over substantially all of said member having a peripheral connecting wall joining them around the member,
   C. a plurality of tying links extending between the parallel walls on the interior of the member and comprising
      i. each such link being integral with a first parallel wall and comprising an indented formation having a bottom which is generally parallel with said first parallel wall from which the indented formation extends,
      ii. the depth of the indented formation being such as to carry the said bottom into engagement with the interior surface of a portion of the second and opposite parallel wall and forming a web therewith which is approximately twice the thickness of either of the parallel walls,
      iii. the indented formation being produced during the blow-molding operation whereby the said bottom and the said portion of the respective parallel walls are permanently welded together,
   D. said tying links being distributed generally throughout the enter area of said member whereby to rigidify and strengthen said member throughout its area to serve as weight support and
   E. said member having means to accommodate if not enable securement of automotive hardware.

2. The structural member as claimed in claim 1 in which the said portion of the opposite parallel wall comprises the unindented interior surface of said second and opposite wall.

3. The structural member as claimed in claim 1 in which said portion of the second and opposite parallel wall comprises the bottom of a second indented formation in said opposite parallel wall and aligned with the first mentioned formation so that the bottoms meet and are welded together during the blow-molding operation.

4. The structural member as claimed in claim 1 in which substantially all of the indented formations extend inwardly from a single one of said parallel walls whereby the other parallel wall presents a substantially unindented surface suitable for use as the top of a load floor.

5. The structural member as claimed in claim 1 in which the geometric configuration of said indented formations comprise rectangles in cross section.

6. The structural member as claimed in claim 5 in which at least some of the indented formations are substantially frusto-pyramidal.

7. The structural member as claimed in claim 1 in which at least one of the indented formations is frusto-conical.

8. The structural member as claimed in claim 1 in which at least one of the indented formations is substantially cylindrical.

9. The structural member as claimed in claim 1 in which said last mentioned means comprise a depression in a parallel wall of said member formed during blow-molding whereby to bring the bottom of said depression into welded engagement with a portion of the other parallel wall to form a double thickness web thereat.

10. The structural member as claimed in claim 1 in which said last mentioned means comprise metal insert means permanently anchored in said member in at least one of said parallel walls and presenting socket means for fasteners to the exterior of said one parallel wall.

11. The structural member as claimed in claim 9 in which said means to enable accommodation if not securement also comprising metal insert means permanently anchored adjacent said depression in at least one of said parallel walls and presenting socket means for fasteners to the exterior of said one parallel wall.

12. The structural member as claimed in claim 10 in which tying links are located additionally in the immediate vicinity of said metal insert means.

13. The structural member as claimed in claim 1 in which said last mentioned means comprise a depression in a parallel wall of said member spaced slightly below the surface of said wall and having an offset wall integral with and connected to said last mentioned parallel wall thereby a hardware plate member may be seated therein.

14. The structural member as claimed in claim 13 in which tying link means are provided connecting the last mentioned offset wall and the opposite parallel wall to strengthen the offset wall, said tying link means being of substantially the same construction as the said tying link but having an overall length shorter than the distance between the said parallel walls.

15. The structural member as claimed in claim 14 in which there are metal insert means permanently anchored to said offset wall and presenting socket means for fasteners to the exterior of said offset wall and at least some of the tying link means are located adjacent the metal insert means.

16. The combination with an automotive vehicle seat back adapted to be moved between at least two positions, one of which is erect for serving as a back rest and the other of which is flat for serving as a load floor, of a structural member incorporated into and connected with said seat back, said structural member comprising that claimed in claim 1.

17. The combination with an automotive vehicle seat back adapted to be moved between at least two positions, one of which is erect for serving as a back rest and the other of which is flat for serving as a load floor, of a structural member incorporated into and connected with said seat back, said structural member comprising that claimed in claim 2.

18. The combination with an automotive vehicle seat back adapted to be moved between at least two positions, one of which is erect for serving as a back rest and the other of which is flat for serving as a load floor, of a structural member incorporated into and connected with said seat back, said structural member comprising that claimed in claim 3.

19. The combination with an automotive vehicle seat back adapted to be moved between at least two positions, one of which is erect for serving as a back rest and the other of which is flat for serving as a load floor, of a structural member incorporated into and connected with said seat back, said structural member comprising that claimed in claim 4.

* * * * *